United States Patent
Che et al.

(10) Patent No.: US 12,172,813 B2
(45) Date of Patent: Dec. 24, 2024

(54) DEGRADABLE PLASTIC BOTTLE, PREPARATION METHOD AND DEGRADATION METHOD THEREOF

(71) Applicants: JIANGSU TRUST CROP PROTECTION TECHNOLOGY CO., LTD., Jiangsu (CN); NANJING YOUJU ENVIRONMENTAL PROTECTION MATERIAL CO., LTD., Jiangsu (CN); JIANGSU XINSHENGQI PLASTICS INDUSTRY TECHNOLOGY CO., LTD., Jiangsu (CN)

(72) Inventors: Hong Che, Jiangsu (CN); Wei Jiang, Jiangsu (CN)

(73) Assignees: JIANGSU TRUST CROP PROTECTION TECHNOLOGY CO., LTD., Jiangsu (CN); NANJING YOUJU ENVIRONMENTAL PROTECTION MATERIAL CO., LTD., Jiangsu (CN); JIANGSU XINSHENGQI PLASTICS INDUSTRY TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/769,878

(22) Filed: Jul. 11, 2024

(65) Prior Publication Data
US 2024/0359892 A1 Oct. 31, 2024

Related U.S. Application Data

(63) Continuation of application No. PCT/CN2023/085910, filed on Apr. 3, 2023.

(30) Foreign Application Priority Data

Feb. 22, 2023 (CN) .......................... 202310150872.5

(51) Int. Cl.
| | |
|---|---|
| B65D 65/46 | (2006.01) |
| B65D 1/02 | (2006.01) |
| C08L 67/02 | (2006.01) |
| C08L 67/04 | (2006.01) |

(52) U.S. Cl.
CPC ......... *B65D 65/466* (2013.01); *B65D 1/0207* (2013.01); *C08L 67/02* (2013.01); *C08L 67/04* (2013.01); *B65D 2565/381* (2013.01); *C08L 2201/06* (2013.01); *C08L 2203/10* (2013.01); *C08L 2205/035* (2013.01); *Y10T 428/1352* (2015.01); *Y10T 428/1397* (2015.01)

(58) Field of Classification Search
CPC ................ B65D 65/466; B65D 1/0207; B65D 2565/381; C08L 67/02; C08L 67/04; C08L 2201/06; C08L 2203/10; C08L 2205/035; Y10T 428/1352; Y10T 428/1397

See application file for complete search history.

(56) References Cited

U.S. PATENT DOCUMENTS

2021/0246303 A1* 8/2021 Bailey ..................... C08L 67/04

FOREIGN PATENT DOCUMENTS

| CN | 102993656 A | 3/2013 |
| CN | 107501881 A | 12/2017 |

OTHER PUBLICATIONS

First Office Action cited in corresponding Japanese patent application No. 2024-010383, dated May 14, 2024, 6 pages.

* cited by examiner

*Primary Examiner* — James C Yager
(74) *Attorney, Agent, or Firm* — Cooper Legal Group, LLC

(57) ABSTRACT

The present application relates to a technical field of plastic article, and in particular, to a degradable plastic bottle, a preparation method therefor and a degradation method therefor. The bottle is prepared by blowing a combined degradable material formed by melting and extruding a resin mixture, the resin mixture includes the following components in parts by weight: 10-60 parts of polylactic acid, 20-50 parts of polybutylene adipate terephthalate, 0.5-20 parts of polymethyl ethylene carbonate, 0.5-20 parts of polyglycolic acid, and 1-10 parts of calcium carbonate.

16 Claims, No Drawings

DEGRADABLE PLASTIC BOTTLE, PREPARATION METHOD AND DEGRADATION METHOD THEREOF

CROSS-REFERENCE TO RELATED APPLICATION

The present application is a continuation of PCT application no. PCT/CN2023/085910, filed on Apr. 3, 2023, which claims the priority and benefits of China patent application No. 202310150872.5, filed on Feb. 22, 2023. The entireties of PCT application no. PCT/CN2023/085910 and China patent application No. 202310150872.5 are hereby incorporated by reference herein and made a part of this specification.

TECHNICAL FIELD

The present application relates to a technical field of plastic article, and in particular, to a degradable plastic bottle, a preparation method and a degradation method thereof.

BACKGROUND ART

Due to increasingly accumulated wasted plastic, application of biodegradable material is gaining more and more attention by the people. One of the effective methods for reducing the accumulation of wasted plastic is to use degradable materials for producing a variety of plastic articles, and performing harmless processing on recycled degradable plastic articles by using a supported recycling and degradation method.

In a related technology, a degradable plastic bottle for pesticide is prepared by blowing a blend of polybutylene terephthalate (PBAT) and polylactic acid (PLA). Composition of the blend includes 10-60 weight parts of polylactic acid, 20-50 weight parts of polybutylene adipate terephthalate and 1-10 weight parts of calcium carbonate, which is prepared by the following method: (1) mixing calcium carbonate, polybutylene adipate terephthalate and polylactic acid to obtain a resin mixture, and melting the resin mixture to obtain a melt; and (2) extruding the melt to obtain a combined degradation material, polybutylene adipate terephthalate and polylactic acid are mixed, in which polybutylene adipate terephthalate can improve a tenacity of polylactic acid, which facilitates improving mechanical performance of the pesticide bottle.

For the above related technology, it is found that, in spite of improved mechanical performance of polylactic acid by using the existing polybutylene adipate terephthalate, regularity of polylactic acid molecular chain is destroyed by a benzene ring present in polybutylene adipate terephthalate molecular chain, such that crystallinity of polylactic acid is decreased. However, most of the existing pesticide products contain an organic solvent, the decreasing of the crystallinity of polylactic acid can degrade a barrier effect of the pesticide bottle against the organic solvent, which render it difficult to meet a requirement for a storage period of the existing pesticide products, hindering a long period storage of the pesticide products.

SUMMARY

In the related technology, polybutylene adipate terephthalate can lead to a descending of the crystallinity of polylactic acid, such that the degradable pesticide plastic bottle is difficult to meet current requirements for the pesticide products for a storage period and to facilitate a long period of storage for the pesticide. In order to improve the defect, the present application provides a degradable plastic bottle, a preparation method therefor and a degradation method therefor.

In a first aspect, the present application provides a degradable plastic bottle, adopting the following technical solution:

A degradable plastic bottle is prepared by blowing a combined degradable material formed by melting and extruding a resin mixture, the resin mixture includes the following components in parts by weight: 10-60 parts of polylactic acid, 20-50 parts of polybutylene adipate terephthalate, 0.5-20 parts of polymethyl ethylene carbonate, 0.5-20 parts of polyglycolic acid, and 1-10 parts of calcium carbonate.

By adopting the above technical solution, comparing with a related technology, adding the polymethyl ethylene carbonate and polyglycolic acid to the resin mixture in the present application, the compatibility of the polymethyl ethylene carbonate and polylactic acid is better than that of polybutylene adipate terephthalate and polylactic acid, so that the added material is more easily dispersed uniformly in polylactic acid. In the melting state of the resin mixture, the polymethyl ethylene carbonate in polylactic acid plays a role of solvent, which facilitates rearranging the chain segment of polylactic acid, and improving a crystallization performance of polylactic acid. Since the crystallization performance of polylactic acid can be improved, as well as polyglycolic acid can play a role of nucleation in the crystallization process of polylactic acid, so as to improve the crystallinity of polylactic acid, thereby facilitating improving a barrier effect of the degradable plastic bottle on organic solvent.

The degradable plastic bottle is filled with the liquid pesticide in the present application, organic solvent in the pesticide is difficult to pass through the bottle wall, thereby reducing a possibility of loss of components in the pesticide, achieving a successful application of the degradable material on production of the pesticide bottle, and facilitating a long period of storage for the pesticide.

Optionally, the resin mixture includes the following components in parts by weight: 20-50 parts of polylactic acid, 30-40 parts of polybutylene adipate terephthalate, 5-15 parts of polymethyl ethylene carbonate, 5-15 parts of polyglycolic acid, and 3-7 parts of calcium carbonate.

By adopting the above technical solution, a composition ratio of the resin mixture is preferably selected, which facilitates improving the barrier effect of the degradable plastic bottle against organic solvent.

Optionally, the resin mixture further includes 0.5-20 parts of poly butylene succinate (PBS).

By adopting the above technical solution, after mixing poly butylene succinate and polylactic acid, an impact strength of the mixture can be higher than that of the mixture when there is no poly butylene succinate, improving a resistance effect of the degradable plastic bottle on impact of an external force, and facilitating improving an anti-dropping performance of the degradable plastic bottle.

Optionally, the resin mixture further includes 0.5-20 parts of polycaprolactone.

By adopting the above technical solution, adding the polycaprolactone can relieve a brittleness of poly butylene succinate, while improve a compatibility of polylactic acid and polybutylene adipate terephthalate, and improving a phase interface between polybutylene adipate terephthalate and polylactic acid. Under the combined action on the improvement of the phase interface and the increase in compatibility of polylactic acid and polybutylene adipate terephthalate, the anti-dropping performance of the degradable plastic bottle can be further improved.

Optionally, the component of polylactic acid includes at least one of poly(L-lactide) and D-polylactic acid.

By adopting the above technical solution, poly(L-lactide) and poly(D-lactide) is a pair of chiral isomers of polylactic acid, when components of polylactic acid contain poly(L-lactide) and poly(D-lactide), a stereoscopic composite crystal is formed by melting and mixing poly(L-lactide) and poly(D-lactide), stacking of molecular chain of the stereoscopic composite crystal is more inseparable comparing to poly(L-lactide) crystal, poly(D-lactide) crystal. Meanwhile, since the stereoscopic composite crystal is formed, improving a regularity of polylactic acid, thereby achieving a compensation for the loss of regularity due to polybutylene adipate terephthalate, and reducing a negative impact of polybutylene adipate terephthalate on crystallinity of polylactic acid. Therefore, polylactic acid containing poly(L-lactide) and poly(D-lactide) can have a more higher crystallinity, which facilitates improving the barrier effect of the degradable plastic bottle against organic solvent.

Optionally, a weight ratio of poly(D-lactide) and poly(L-lactide) in polylactic acid is 1:(0.8-1.2).

By adopting the above technical solution, the weight ratio of poly(D-lactide) and poly(L-lactide) is preferably selected. Under a situation that content of poly(D-lactide) is close to that of poly(L-lactide), this facilitates forming the stereoscopic composite crystal in polylactic acid. The increasing of the content of the stereoscopic composite crystal can increase crystallinity of polylactic acid, which facilitates improving the barrier effect of the degradable plastic bottle against organic solvent.

Optionally, the average molecular weight of poly(L-lactide) is 1000-4200.

By adopting the above technical solution, when the average molecular weight of poly(L-lactide) is too large, a homogenous crystal can be easily formed by poly(L-lactide) and poly(D-lactide), which replaces the stereoscopic composite crystal. Therefore, the average molecular weight of poly(L-lactide) is preferably selected in the present application, the above range facilitates forming the stereoscopic composite crystal, thereby increasing the crystallinity of polylactic acid, and improving the barrier effect of the degradable plastic bottle against organic solvent.

Optionally, an average molecular weight of poly(D-lactide) is 1000-20000.

By adopting the above technical solution, when the average molecular weight of poly(D-lactide) is too large, poly(L-lactide) and poly(D-lactide) can be easy to form a homogenous crystal, not to form a stereoscopic composite crystal, similarly. Therefore, the average molecular weight of poly(D-lactide) is preferably selected in the present application, facilitating forming the stereoscopic composite crystal, improving the crystallinity of polylactic acid, and helping to improve the barrier effect of the degradable plastic bottle on organic solvent.

In addition, the resin mixture of the present application further can add some auxiliary components to improve performance, such as modified starch, talcum powder and compounded cross-linking agent (a composition of pectin and nano organic bentonite).

In a second aspect, the present application provides a resin mixture for preparing the degradable material, adopting the following technical solution as follows:

The resin mixture includes the following components in parts by weight: 10-60 parts of polylactic acid, 20-50 parts of polybutylene adipate terephthalate, 0.5-20 parts of polymethyl ethylene carbonate, 0.5-20 parts of polyglycolic acid, and 1-10 parts of calcium carbonate.

Optionally, the resin mixture includes the following components in parts by weight: 20-50 parts of polylactic acid, 30-40 parts of polybutylene adipate terephthalate, 5-15 parts of polymethyl ethylene carbonate, 5-15 parts of polyglycolic acid, and 3-7 parts of calcium carbonate.

Optionally, the resin mixture further includes 0.5-20 parts of poly butylene succinate (PBS).

Optionally, the resin mixture further includes 0.5-20 parts of polycaprolactone.

Optionally, the component of polylactic acid includes at least one of poly(L-lactide), poly(D-lactide).

Optionally, a weight ratio of poly(D-lactide) and the poly(L-lactide) in the polylactic acid is 1:(0.8-1.2).

Optionally, the average molecular weight of the poly(L-lactide) is 1000-4200.

Optionally, the average molecular weight of poly(D-lactide) is 1000-20000.

In a third aspect, the present application provides a method for preparing the degradable plastic bottle, adopting the following technical solution as follows:

A method for preparing the degradable plastic bottle, including the following steps:

(1) melting the above resin mixture at a temperature of 100-400° C., and extruding to obtain a combined degradable material;

(2) blowing the combined degradable material of the step (1) at a temperature of 60-160° C. to obtain a degradable plastic bottle.

By adopting the above technical solution, primarily melting the resin mixture in the present application, then extruding the melted mixture to obtain the combined degradable material, subsequently blowing at a temperature of 60-160° C.

In a fourth aspect, the present application provides a process for degrading the degradable plastic bottle, adopting the following technical solution:

A process for degrading the degradable plastic bottle, including the following steps as follows:

(1) recycling and crushing the above-mentioned degradable plastic bottle to obtain a crushed material; and (2) mixing the crushed material and compost by a weight ratio of (20-80):(80-20), then putting into a breathable bag, further embedding the breathable bag into compost at a temperature of 50-65° C., and taking out of the breathable bag after waiting for 145-180 days, that is, achieving degradation of the degradable plastic bottle.

By adopting the above technical solution, each of organic components of the degradable plastic bottle in the present application is degradable material. Referring to the method of the present application to perform the degradation, the degradable plastic bottle, the recycled degradable plastic bottle is primarily crushed to obtain the crushed material, on this basis, range of the weight ratio of the crushed material and compost is preferably selected in the present application, according to the weight ratio, the degradation is namely achieved by composting treatment for 14-20 days at a temperature of 50-65° C.

In summary, the present application can achieve at least one of the following beneficial technical effects:

1. The polymethyl ethylene carbonate and polyglycolic acid are added in raw material of the degradable plastic bottle in the present application, the polymethyl ethylene carbonate can improve crystallization performance of polylactic acid, then nucleation of polyglycolic acid can improve the crystallinity of polylactic acid, improving the barrier effect of the pesticide bottle on organic solvent, reducing the possibility of components of the pesticide being lost, achieving a successful application of the degradable material on production of the pesticide bottle, and facilitating a long period of storage for the pesticide.

2. The components of polylactic acid in the present application includes at least one of poly(L-lactide), poly(D-lactide), when component of polylactic acid includes poly(L-lactide) and poly(D-lactide), the stereoscopic composite crystal is formed by mixing poly(L-lactide) and poly(D-lactide), increasing the crystallinity of polylactic acid, and improving the barrier effect of the pesticide bottle on organic solvent.

DETAILED DESCRIPTION

The present application will further described in detail below in connection with Examples, Preparation Examples and Comparative Examples. The raw materials involved in the present application can be commercially available.

EXAMPLES

Examples 1-5

Example 1 was described below as an example.

Example 1

The present example provided a degradable plastic bottle, which was prepared by blowing molding of a combined degradable material forming by melting and extrusion molding a resin mixture. The resin mixture included the following components in parts by weight: 10 kg of polylactic acid, 20 kg of polybutylene adipate terephthalate, 0.5 kg of polymethyl ethylene carbonate, 0.5 kg of polyglycolic acid and 1 kg of calcium carbonate, in which polylactic acid was poly(L-lactide) with average molecule weight of 5000.

In the present example, the degradable plastic bottle was prepared according to the following steps:

(1) melting the above resin mixture at a temperature of 240° C., and performing extrusion molding to obtain the combined degradable material;

(2) blow molding the combined degradable material obtained in the step (1) at a temperature of 70° C. to obtain the degradable plastic bottle.

As shown in Table 1, Examples 1-5 differed from one another by different proportioning of raw materials of the resin mixture.

The present Example further provided a process for degrading the degradable plastic bottle, including the following steps:

(1) recycling and crushing the degradable plastic bottle to obtain a crushed material;

(2) mixing the crushed material and compost by a weight ratio of 80:20, then putting into a breathable bag, further embedding the breathable bag into the compost at a temperature of 60° C., standing for 150 days and taking out the breathable bag, thereby achieving degradation of the degradable plastic bottle. In the present step, the raw material of the compost consisted of pig manure, corn straw, and polylactic acidnt ash by a weight ratio of 4:6:1.

TABLE 1

| proportioning of raw material of the resin mixture | | | | |
|---|---|---|---|---|
| Samples | polylactic acid/kg | polybutylene adipate terephthalate/kg | polymethyl ethylene carbonate/kg | poly-glycolic acid/kg | Calcium carbonate/kg |
| Example 1 | 10 | 20 | 0.5 | 0.5 | 1 |
| Example 2 | 20 | 30 | 5 | 5 | 3 |
| Example 3 | 35 | 35 | 10 | 10 | 5 |
| Example 4 | 50 | 40 | 15 | 15 | 7 |
| Example 5 | 60 | 50 | 20 | 20 | 10 |

Example 6

The present Example differed from Example 4 by further including 0.5 kg of poly butylene succinate.

As shown in Table 2, Examples 6-10 differed from one another by different usage amount of poly butylene succinate.

TABLE 2 usage of the poly butylene succinate

| Samples | Example 6 | Example 7 | Example 8 | Example 9 | Example 10 |
|---|---|---|---|---|---|
| poly butylene succinate/kg | 0.5 | 8 | 16 | 20 | 28 |

Example 11

The present Example differed from Example 9 in that the resin mixture further included 0.5 kg of polycaprolactone.

As shown in Table 3, Examples 11-15 differed from one another by different usage amount of polycaprolactone.

TABLE 3 usage of the polycaprolactone

| Samples | Example 11 | Example 12 | Example 13 | Example 14 | Example 15 |
|---|---|---|---|---|---|
| polycaprolactone/kg | 0.5 | 8 | 16 | 20 | 28 |

Example 16

The present Example differed from Example 4 in that polylactic acid was poly(D-lactide) with average molecule weight of 20000.

Example 17

The present Example differed from Example 4 in that polylactic acid consisted of poly(L-lactide) with average molecule weight of 5000 and poly(D-lactide) with average molecule weight of 24000 by a weight ratio of 1:0.6.

As shown in Table 4, Examples 17-21 differed from one another by different weight ratios of poly(D-lactide) and poly(L-lactide).

TABLE 4 weight ratio of poly(D-lactide) and poly(L-lactide)

| Samples | Example 17 | Example 18 | Example 19 | Example 20 | Example 21 |
|---|---|---|---|---|---|
| poly(D-lactide):poly(L-lactide) | 1:0.6 | 1:0.8 | 1:1 | 1:1.1 | 1:1.2 |

As shown in Table 5, Examples 22-25 differed from Example 19 in that average molecule weight of poly(L-lactide) was different.

TABLE 5 average weight of poly(L-lactide)

| Samples | Example 19 | Example 22 | Example 23 | Example 24 | Example 25 |
|---|---|---|---|---|---|
| Average molecule weight of poly(L-lactide) | 5000 | 3400 | 2600 | 1500 | 1000 |

As shown in Table 6, Examples 26-29 differed from Example 24 in that average molecule weight of poly(D-lactide) was different.

TABLE 6 average molecule weight of poly(D-lactide)

| Samples | Example 24 | Example 26 | Example 27 | Example 28 | Example 29 |
|---|---|---|---|---|---|
| Average molecule weight of poly(D-lactide) | 24000 | 15000 | 10000 | 5000 | 1000 |

COMPARATIVE EXAMPLE

Comparative Example 1

A degradable plastic bottle for pesticide was prepared by blowing molding a mixture of polybutylene adipate terephthalate and polylactic acid at a temperature of 160° C. The mixture included 50 kg of polylactic acid (PLLA with average molecule weight of 5500), 40 kg of polybutylene adipate terephthalate and 5 kg of calcium carbonate, the mixture was prepared by the following method:

(1) mixing the calcium carbonate, polybutylene adipate terephthalate and polylactic acid to obtain a resin mixture, and melting the resin mixture at a temperature of 200° C. to obtain a melt;

(2) extrusion molding the melt to obtain the combined degradable material.

Comparative Example 2

The Comparative Example differed from Example 4 in that there was no polymethyl ethylene carbonate in the components of the resin mixture.

Comparative Example 3

The Comparative Example differed from Example 4 in that there was no polyglycolic acid in the components of the resin mixture.

Performance Detection Experiment Method

I. Barrier Performance

Referring to a standard "American Society for Testing and Materials ASTM D2684-1995 standard", barrier performance of the degradable plastic bottle was tested, then permeability ratios of individual Examples, Comparative Examples and Comparative Example 1 were calculated, and the ratios were recorded as relative permeability. Results were shown in Table 7.

Referring to the standard "BB/T 0044-2007 packaging container plastic bottle for pesticide", leakage amount (thermal storage weight loss) and air-tightness of the examples were tested. Results were shown in Table 8.

TABLE 7

| relative permeability | |
| --- | --- |
| Samples | Relative permeability/% |
| Example 1 | 91.9 |
| Example 2 | 78.5 |
| Example 3 | 73.6 |
| Example 4 | 69.8 |
| Example 5 | 71.2 |
| Example 16 | 76.5 |
| Example 17 | 61.4 |
| Example 18 | 59.5 |
| Example 19 | 57.9 |
| Example 20 | 58.2 |
| Example 21 | 60.8 |
| Example 22 | 55.3 |
| Example 23 | 53.5 |
| Example 24 | 51.7 |
| Example 25 | 50.4 |
| Example 26 | 49.2 |
| Example 27 | 47.6 |

TABLE 7-continued

| relative permeability | |
| --- | --- |
| Samples | Relative permeability/% |
| Example 28 | 46.5 |
| Example 29 | 45.2 |
| Comparative Example 1 | 100.0 |
| Comparative Example 2 | 94.2 |
| Comparative Example 3 | 92.7 |

TABLE 8

| test result of air-tightness and leakage amount | | |
| --- | --- | --- |
| Samples | Air-tightness (20 kPa) | Leakage amount |
| Example 1 | No leakage | ≤1.5% |
| Example 2 | No leakage | ≤1.5% |
| Example 3 | No leakage | ≤1.5% |
| Example 4 | No leakage | ≤1.5% |
| Example 5 | No leakage | ≤1.5% |
| Example 6 | No leakage | ≤1.5% |
| Example 7 | No leakage | ≤1.5% |
| Example 8 | No leakage | ≤1.5% |
| Example 9 | No leakage | ≤1.5% |
| Example 10 | No leakage | ≤1.5% |
| Example 11 | No leakage | ≤1.5% |
| Example 12 | No leakage | ≤1.5% |
| Example 13 | No leakage | ≤1.5% |
| Example 14 | No leakage | ≤1.5% |
| Example 15 | No leakage | ≤1.5% |
| Example 16 | No leakage | ≤1.5% |
| Example 17 | No leakage | ≤1.5% |
| Example 18 | No leakage | ≤1.5% |
| Example 19 | No leakage | ≤1.5% |
| Example 20 | No leakage | ≤1.5% |
| Example 21 | No leakage | ≤1.5% |
| Example 22 | No leakage | ≤1.5% |
| Example 23 | No leakage | ≤1.5% |
| Example 24 | No leakage | ≤1.5% |
| Example 25 | No leakage | ≤1.5% |
| Example 26 | No leakage | ≤1.5% |
| Example 27 | No leakage | ≤1.5% |
| Example 28 | No leakage | ≤1.5% |
| Example 29 | No leakage | ≤1.5% |
| / | / | / |

II. Anti-Dropping Performance

Fifteen degradable plastic bottle of the same example was used as samples to perform a test according to test method of anti-dropping performance recorded on the standard "BB/T 0044-2007 packaging container plastic bottle for pesticide". When testing, the degradable plastic bottle was dropped repeatedly until it was damaged and leaked. After finishing testing a group of samples, average amount of times of anti-dropping were calculated corresponding to the occurrence of damage and leakage. After the average amount was calculated, the ratio of average amount for each group of samples and that for Example 4 was calculated, and relative anti-dropping performance was recorded. The calculation results of relative anti-dropping performance were shown in Table 9.

In addition, according to a fifth time for dropping stipulated in the standard "BB/T 0044-2007 packaging container plastic bottle for pesticide", further testing anti-dropping performance for each Example. Results were shown in Table 10.

TABLE 9 relative anti-dropping performance

| Samples | Relative anti-dropping performance/% |
|---|---|
| Example 4 | 100.0 |
| Example 6 | 119.6 |
| Example 7 | 155.2 |
| Example 8 | 168.8 |
| Example 9 | 177.6 |
| Example 10 | 180.4 |
| Example 11 | 183.2 |
| Example 12 | 206.1 |
| Example 13 | 224.8 |
| Example 14 | 237.8 |
| Example 15 | 244.4 |

TABLE 10 anti-dropping performance (5 times)

| Samples | Evaluation |
|---|---|
| Example 1 | No damage and no leakage |
| Example 2 | No damage and no leakage |
| Example 3 | No damage and no leakage |
| Example 4 | No damage and no leakage |
| Example 5 | No damage and no leakage |
| Example 6 | No damage and no leakage |
| Example 7 | No damage and no leakage |
| Example 8 | No damage and no leakage |
| Example 9 | No damage and no leakage |
| Example 10 | No damage and no leakage |
| Example 11 | No damage and no leakage |
| Example 12 | No damage and no leakage |
| Example 13 | No damage and no leakage |
| Example 14 | No damage and no leakage |
| Example 15 | No damage and no leakage |
| Example 16 | No damage and no leakage |
| Example 17 | No damage and no leakage |
| Example 18 | No damage and no leakage |
| Example 19 | No damage and no leakage |
| Example 20 | No damage and no leakage |
| Example 21 | No damage and no leakage |
| Example 22 | No damage and no leakage |
| Example 23 | No damage and no leakage |
| Example 24 | No damage and no leakage |
| Example 25 | No damage and no leakage |
| Example 26 | No damage and no leakage |
| Example 27 | No damage and no leakage |
| Example 28 | No damage and no leakage |
| Example 29 | No damage and no leakage |
| / | / |

III. Axial Bearing Pressure and Internal Pressure Resistance

Referring to the standard "BB/T 0044-2007 packaging container plastic bottle for pesticide", the axial bearing pressure and the internal pressure resistance were tested. Results were shown in Table 11.

TABLE 11 axial bearing pressure and internal pressure resistance

| Samples | Axial bearing pressure | Internal pressure resistance |
|---|---|---|
| Example 1 | ≥200N | No damage and no leakage |
| Example 2 | ≥200N | No damage and no leakage |
| Example 3 | ≥200N | No damage and no leakage |
| Example 4 | ≥200N | No damage and no leakage |
| Example 5 | ≥200N | No damage and no leakage |
| Example 6 | ≥200N | No damage and no leakage |
| Example 7 | ≥200N | No damage and no leakage |
| Example 8 | ≥200N | No damage and no leakage |
| Example 9 | ≥200N | No damage and no leakage |
| Example 10 | ≥200N | No damage and no leakage |
| Example 11 | ≥200N | No damage and no leakage |
| Example 12 | ≥200N | No damage and no leakage |
| Example 13 | ≥200N | No damage and no leakage |
| Example 14 | ≥200N | No damage and no leakage |
| Example 15 | ≥200N | No damage and no leakage |
| Example 16 | ≥200N | No damage and no leakage |
| Example 17 | ≥200N | No damage and no leakage |
| Example 18 | ≥200N | No damage and no leakage |
| Example 19 | ≥200N | No damage and no leakage |
| Example 20 | ≥200N | No damage and no leakage |
| Example 21 | ≥200N | No damage and no leakage |
| Example 22 | ≥200N | No damage and no leakage |
| Example 23 | ≥200N | No damage and no leakage |
| Example 24 | ≥200N | No damage and no leakage |
| Example 25 | ≥200N | No damage and no leakage |
| Example 26 | ≥200N | No damage and no leakage |
| Example 27 | ≥200N | No damage and no leakage |
| Example 28 | ≥200N | No damage and no leakage |
| Example 29 | ≥200N | No damage and no leakage |
| / | / | / |

IV. Degradation Performance

Referring to the standards "ISO 14855-1:2012 Determination of the ultimate aerobic biodegradability of plastic materials under controlled composting conditions—Method by analysis of evolved carbon dioxide—Part 1: General method" and "GB/T 19277.1-2011 Determination of ultimate aerobic biodegradation capacity of materials under controlled composting conditions using the method for determining released carbon dioxide Part 1: General method", the degradation performance for degradable plastic bottle was tested, the average amount of test days were 147 days. The judgment content includes the following three indexes:

(1) Biodegradation rate of reference material after 45 days>71.0%.
(2) Relative deviation of biodegradation percentage of reference material for different container<20%.
(3) Average amount of carbon dioxide content produced in the blank container for 10 days before the test including 50-150 mg of $CO_2$/g volatile solid.

The judgment result was shown in Table 12

TABLE 12

The judgment result of degradation performance

| Samples | Judgment result |
|---|---|
| Example 1 | Qualified for the three indexes |
| Example 2 | Qualified for the three indexes |
| Example 3 | Qualified for the three indexes |
| Example 4 | Qualified for the three indexes |
| Example 5 | Qualified for the three indexes |
| Example 6 | Qualified for the three indexes |
| Example 7 | Qualified for the three indexes |
| Example 8 | Qualified for the three indexes |
| Example 9 | Qualified for the three indexes |
| Example 10 | Qualified for the three indexes |
| Example 11 | Qualified for the three indexes |
| Example 12 | Qualified for the three indexes |
| Example 13 | Qualified for the three indexes |
| Example 14 | Qualified for the three indexes |
| Example 15 | Qualified for the three indexes |
| Example 16 | Qualified for the three indexes |
| Example 17 | Qualified for the three indexes |
| Example 18 | Qualified for the three indexes |
| Example 19 | Qualified for the three indexes |

TABLE 12-continued

The judgment result of degradation performance

| Samples | Judgment result |
| --- | --- |
| Example 20 | Qualified for the three indexes |
| Example 21 | Qualified for the three indexes |
| Example 22 | Qualified for the three indexes |
| Example 23 | Qualified for the three indexes |
| Example 24 | Qualified for the three indexes |
| Example 25 | Qualified for the three indexes |
| Example 26 | Qualified for the three indexes |
| Example 27 | Qualified for the three indexes |
| Example 28 | Qualified for the three indexes |
| Example 29 | Qualified for the three indexes |
| / | / |

V. Appearance Quality

Referring to the standard "BB/T 0044-2007 packaging container plastic bottle for pesticide", the appearance quality was tested, and judgement content included the following six indexes:

(1) The deviation of the inner diameter of the bottle mouth was within ±0.40 mm.
(2) The deviation of the outer diameter of the bottle mouth was within ±0.40 mm.
(3) The height deviation was within the range of ±1.5 mm.
(4) Verticality deviation≤4.5 mm.
(5) The ratio of minimum wall thickness to symmetrical wall thickness was ≤1.3.
(6) The quality deviation was within the range of ±5%.

Judgement result was as shown in Table 13

TABLE 13 judgement result of appearance quality

| Samples | Judgement result |
| --- | --- |
| Example 1 | Qualified for the six indexes |
| Example 2 | Qualified for the six indexes |
| Example 3 | Qualified for the six indexes |
| Example 4 | Qualified for the six indexes |
| Example 5 | Qualified for the six indexes |
| Example 6 | Qualified for the six indexes |
| Example 7 | Qualified for the six indexes |
| Example 8 | Qualified for the six indexes |
| Example 9 | Qualified for the six indexes |
| Example 10 | Qualified for the six indexes |
| Example 11 | Qualified for the six indexes |
| Example 12 | Qualified for the six indexes |
| Example 13 | Qualified for the six indexes |
| Example 14 | Qualified for the six indexes |
| Example 15 | Qualified for the six indexes |
| Example 16 | Qualified for the six indexes |
| Example 17 | Qualified for the six indexes |
| Example 18 | Qualified for the six indexes |
| Example 19 | Qualified for the six indexes |
| Example 20 | Qualified for the six indexes |
| Example 21 | Qualified for the six indexes |
| Example 22 | Qualified for the six indexes |
| Example 23 | Qualified for the six indexes |
| Example 24 | Qualified for the six indexes |
| Example 25 | Qualified for the six indexes |
| Example 26 | Qualified for the six indexes |
| Example 27 | Qualified for the six indexes |
| Example 28 | Qualified for the six indexes |
| Example 29 | Qualified for the six indexes |
| / | / |

Referring to Examples 1-5, Comparative Example 1 and Table 7, it can be seen that, the relative permeability tested by examples 1-5 was lower than that of the Comparative Example 1, indicating that crystallization performance of polylactic acid can be improved by adding polymethyl ethylene carbonate in the present application, and crystallinity of polylactic acid can be improved by nucleation action of polyglycolic acid, thereby improving the barrier effect of the pesticide bottle on organic solvent. The degradable plastic bottle of the present application can not only meet current technical requirements for the pesticide bottle, but also ensure a longer period of storage than the existing pesticide bottles without leakage, which facilitated long storage period of a pesticide. In the Examples 1-5, content of polylactic acid in Example 4 was relatively higher, thereby effect caused by improving the crystallinity of polylactic acid was more obvious. Therefore, the anti permeability performance of Example 4 was relatively better.

From Example 3, Comparative Example 2-3 and Table 7, it can be seen that, when there was no polymethyl ethylene carbonate in the resin mixture, even if polyglycolic acid can poly a role of nucleation, there is no obvious improvement in terms of crystallinity of polylactic acid. When there was no polyglycolic acid in the resin mixture, even if crystallization performance of polylactic acid can be improved by that polymethyl ethylene carbonate-facilitated rearrangement in chain segment of polylactic acid, the improvement for crystallinity of polylactic acid was further relatively limited.

From Examples 1-29 and Table 8, it can be seen that, the degradable plastic bottles of the examples in the present application can meet the relevant regulations on air-tightness and leakage amount in existing technical indicators.

From Example 4, Examples 6-10 and Table 9, it can be seen that, adding poly butylene succinate into resin mixture can improve anti-dropping performance of the degradable plastic bottle. As the addition of poly butylene succinate increased, the anti-dropping performance is gradually improved, too. However as the addition of poly butylene succinate increased, the improvement for anti-dropping performance does not shown a linear growth. After addition of poly butylene succinate was more than 20 weight parts, continually adding poly butylene succinate, it was found that the improvement in anti-dropping performance was relatively slight. In order to reduce raw material and control cost, achieving a better performance, and 0.5-20 parts of poly butylene succinate was preferably selected.

From Example 9, Examples 11-15 and Table 7, it can be seen that, on the basis of adding poly butylene succinate, adding polycaprolactone into resin mixture can further improve the anti-dropping performance of the degradable plastic bottle. As the addition of polycaprolactone increased, the anti-dropping performance can gradually be improved. However as the addition of polycaprolactone increased, the improvement of the anti-dropping performance does not show a linear growth. After the addition of polycaprolactone was more than 20 parts, it was found that, the improvement for anti-dropping performance was relatively slight in spite of continuous addition of polycaprolactone. In order to reduce raw material and control cost, achieving a better performance, and 0.5-20 parts of polycaprolactone was preferably selected.

From Example 4, Example 16 and Table 7, it can be seen that, after poly(L-lactide) repolylactic acidced poly(D-lactide), since molecule amount was increasing, so that the crystallinity of polylactic acid decreased, resulting in that the barrier effect of the degradable plastic bottle on organic solvent decreased.

From Example 4, Example 16, Examples 17-21 and Table 7, it can be seen that, the stereoscopic composite crystal was formed by mixing poly(L-lactide) and poly(D-lactide), improving the crystallinity of polylactic acid, and improving the barrier effect of the pesticide bottle on organic solvent. In addition, the usage ratio of poly(L-lactide) and poly(D-lactide) was in the range of 1:(0.8-1.2), barrier effect of the degradable plastic bottle on organic solvent was better, which facilitated long period of storage for pesticide.

From Example 19, Examples 22-29 and Table 7, it can be seen that, poly(L-lactide) and poly(D-lactide) with appropriate average molecule weight facilitated forming the stereoscopic composite crystal, helping improving barrier effect of the degradable plastic bottle on organic solvent. When average molecule weight of poly(L-lactide) is larger than 4200 and that of poly(D-lactide) is more than 20000, the barrier effect of the degradable plastic bottle on organic solvent can be relatively insignificant.

From Examples 1-29 and Tables 10-13, it can be seen that, the degradable plastic bottles of Examples in the present application can meet the relevant regulations on anti-dropping performance, axial bearing pressure, internal pressure resistance, degradation performance and appearance quality in existing technical indicators.

The above are the preferred embodiments of the present application, which are not intended to limit the protection scope of the present application. Therefore, all equivalent changes made according to the structure, shape and principle of the present application should be covered within the protection scope of the present application.

What is claimed is:

1. A degradable plastic bottle, wherein the degradable plastic bottle is prepared by blowing a combined degradable material formed by melting and extruding a resin mixture, and the resin mixture comprises the following components in parts by weight: 10-60 parts of polylactic acid, 20-50 parts of polybutylene adipate terephthalate, 0.5-20 parts of polymethyl ethylene carbonate, 0.5-20 parts of polyglycolic acid, and 1-10 parts of calcium carbonate.

2. The degradable plastic bottle according to claim 1, wherein the resin mixture comprises the following components in parts by weight: 20-50 parts of the polylactic acid, 30-40 parts of the polybutylene adipate terephthalate, 5-15 parts of the polymethyl ethylene carbonate, 5-15 parts of the polyglycolic acid, and 3-7 parts of the calcium carbonate.

3. The degradable plastic bottle according to claim 1, wherein the resin mixture further comprises 0.5-20 parts of poly butylene succinate.

4. The degradable plastic bottle according to claim 3, wherein the resin mixture further comprises 0.5-20 parts of polycaprolactone.

5. The degradable plastic bottle according to claim 1, wherein the polylactic acid comprises at least one of poly(L-lactide) or poly(D-lactide).

6. The degradable plastic bottle according to claim 5, wherein a weight ratio of the poly(D-lactide) and the poly(L-lactide) in the polylactic acid is 1:(0.8-1.2).

7. The degradable plastic bottle according to claim 6, wherein an average molecule weight of the poly(L-lactide) is 1000-4200.

8. The degradable plastic bottle according to claim 7, wherein an average molecule weight of the poly(D-lactide) is 1000-20000.

9. A resin mixture used for preparing degradable material, wherein the resin mixture comprises the following components in parts by weight: 10-60 parts of polylactic acid, 20-50 parts of polybutylene adipate terephthalate, 0.5-20 parts of polymethyl ethylene carbonate, 0.5-20 parts of polyglycolic acid, and 1-10 parts of calcium carbonate.

10. The resin mixture for preparing degradable material according to claim 9, wherein the resin mixture comprises the following components in parts by weight: 20-50 parts of the polylactic acid, 30-40 parts of the polybutylene adipate terephthalate, 5-15 parts of the polymethyl ethylene carbonate, 5-15 parts of the polyglycolic acid, and 3-7 parts of the calcium carbonate.

11. The resin mixture for preparing degradable material according to claim 9, wherein the resin mixture further comprises 0.5-20 parts of poly butylene succinate.

12. The resin mixture for preparing degradable material according to claim 11, wherein the resin mixture further comprises 0.5-20 parts of polycaprolactone.

13. The resin mixture for preparing degradable material according to claim 9, wherein the polylactic acid comprises at least one of poly(L-lactide) or poly(D-lactide).

14. The resin mixture for preparing degradable material according to claim 13, wherein a weight ratio of the poly(D-lactide) and the poly(L-lactide) in the polylactic acid is 1:(0.8-1.2).

15. The resin mixture for preparing degradable material according to claim 14, wherein an average molecule weight of the poly(L-lactide) is 1000-4200.

16. The resin mixture for preparing degradable material according to claim 15, wherein an average molecule weight of the poly(D-lactide) is 1000-20000.

* * * * *